(12) United States Patent  (10) Patent No.: US 11,484,120 B2
Nathan et al.  (45) Date of Patent: Nov. 1, 2022

(54) COOKWARE LID HOLDER (71) Applicant: Caraway Home, Inc., New York, NY (US)

(72) Inventors: Jordan Nathan, New York, NY (US); Benjamin Gross, San Francisco, CA (US); Kenneth Young, San Francisco, CA (US); Bret Recor, San Francisco, CA (US)

(73) Assignee: Caraway Home, Inc., New York, NY (US)

( * ) Notice: Subject to any disclaimer, the term of this patent is extended or adjusted under 35 U.S.C. 154(b) by 0 days.

(21) Appl. No.: 17/063,857

(22) Filed: Oct. 6, 2020

(65) Prior Publication Data
US 2021/0100361 A1 Apr. 8, 2021

Related U.S. Application Data (60) Provisional application No. 62/911,805, filed on Oct. 7, 2019.

(51) Int. Cl.
A47B 81/04 (2006.01)
A47J 36/06 (2006.01)

(52) U.S. Cl.
CPC .............. *A47B 81/04* (2013.01); *A47J 36/06* (2013.01)

(58) Field of Classification Search
CPC .... A47F 7/0064; A47F 5/0807; A47F 5/0815; A47F 7/0057; A47F 7/0042; A47F 7/08; A47F 7/146; A47B 81/04; A47B 61/04; A47B 43/00; A47B 43/003; A45C 7/0095; A45C 3/004; A45C 7/0059; A47G 19/08; A47G 25/005; A47J 47/16; A47J 36/06
USPC ................................. 211/118, 41.2, 41.1, 35
See application file for complete search history.

(56) References Cited

U.S. PATENT DOCUMENTS

| | | | | | |
|---|---|---|---|---|---|
| 1,447,636 | A | * | 3/1923 | White | A47G 25/08 248/301 |
| 1,578,778 | A | * | 3/1926 | Thornhill | A45C 7/0095 190/11 |
| 2,084,779 | A | * | 6/1937 | Rosser | A47B 61/04 211/35 |
| D135,888 | S | * | 6/1943 | Zimmerman | D6/320 |
| D140,671 | S | * | 3/1945 | Pascal | D6/553 |
| 2,634,865 | A | * | 4/1953 | Geheb | A47J 47/16 211/41.11 |
| 2,710,638 | A | * | 6/1955 | Ford | A45C 3/004 383/23 |
| 2,832,389 | A | * | 4/1958 | Smith | A47G 25/005 383/9 |
| 2,866,559 | A | * | 12/1958 | Byrne | A47G 25/005 211/35 |

(Continued)

*Primary Examiner* — Devin K Barnett
(74) *Attorney, Agent, or Firm* — Bochner IP, PLLC; Andrew D. Bochner (57) ABSTRACT

Disclosed is a system for storing one or more cookware lids. The system may include one or more holders or pockets, disposed in one or more tiers. The tiers may be disposed in a column from a top edge of the backing to a bottom edge of the backing. The holders may each be associated with a support sleeve. The system may be formed of a backing made of suitable material, such as cotton canvas. A pair of eyelets may be provided on the system, for hanging or mounting to an interior or exterior area.

9 Claims, 8 Drawing Sheets

(56) References Cited

U.S. PATENT DOCUMENTS

| | | | | |
|---|---|---|---|---|
| 3,389,666 | A * | 6/1968 | Schultze-Bonatz | A47B 47/042 108/17 |
| 3,967,666 | A * | 7/1976 | Farrar | A61G 7/0503 383/7 |
| D247,535 | S * | 3/1978 | Frank | D3/256 |
| 4,132,280 | A * | 1/1979 | Jones | B62D 51/001 16/437 |
| 4,296,876 | A * | 10/1981 | Lefebvre | A47G 25/54 223/91 |
| 4,585,127 | A * | 4/1986 | Benedict | A47B 61/02 211/34 |
| D291,754 | S * | 9/1987 | Griswold | D6/553 |
| 4,738,547 | A * | 4/1988 | Brown | A45C 7/0095 383/119 |
| D300,399 | S * | 3/1989 | Krugman | D6/514 |
| D312,349 | S * | 11/1990 | Pogue | D12/133 |
| 4,967,913 | A * | 11/1990 | Bayer | A47F 5/0006 211/118 |
| 5,025,918 | A * | 6/1991 | Bergeron | A45C 9/00 206/495 |
| 5,121,833 | A * | 6/1992 | Lindsay | A45C 7/0095 206/18 |
| 5,125,519 | A * | 6/1992 | Cambria | A45C 7/0086 211/113 |
| 5,209,344 | A * | 5/1993 | Smith | A45C 7/0095 206/466 |
| D337,467 | S * | 7/1993 | Schmidt | D6/570 |
| 5,427,230 | A * | 6/1995 | Mattox | A45C 11/16 206/478 |
| D364,520 | S * | 11/1995 | Matthews | D6/514 |
| 5,533,534 | A * | 7/1996 | Cariello | A47K 3/281 132/286 |
| 6,158,593 | A * | 12/2000 | Olsen | A63B 47/00 211/14 |
| D480,867 | S * | 10/2003 | Snider | D3/228 |
| D487,635 | S * | 3/2004 | Collins | D3/315 |
| 7,424,958 | B1 * | 9/2008 | Eley | B25H 3/04 211/70.6 |
| D595,918 | S * | 7/2009 | Walter | D34/27 |
| D616,230 | S * | 5/2010 | Leeds | D6/703.4 |
| 7,748,584 | B2 * | 7/2010 | Easom | B25H 3/00 224/401 |
| D666,440 | S * | 9/2012 | Kinskey | D6/514 |
| 8,479,926 | B1 * | 7/2013 | Blaisdell | A47J 47/16 211/41.11 |
| 9,433,838 | B2 * | 9/2016 | Stout | A63B 55/00 |
| 9,700,156 | B1 * | 7/2017 | Hance | A47F 5/005 |
| 10,568,421 | B2 * | 2/2020 | Felsenthal | A47G 29/00 |
| 10,856,657 | B2 * | 12/2020 | Felsenthal | A47B 61/04 |
| 2003/0164345 | A1 * | 9/2003 | Jones | A47J 47/16 211/41.11 |
| 2003/0221978 | A1 * | 12/2003 | Redzisz | A45C 13/04 206/278 |
| 2007/0075203 | A1 * | 4/2007 | Conlin | A01K 1/0114 248/309.1 |
| 2008/0031551 | A1 * | 2/2008 | Jones | B65D 29/00 383/22 |
| 2008/0257840 | A1 * | 10/2008 | Eley | A47F 5/0815 211/59.1 |
| 2009/0057247 | A1 * | 3/2009 | Kral | A47J 45/02 211/41.11 |
| 2009/0108156 | A1 * | 4/2009 | Lang | A47F 5/0815 248/220.31 |
| 2011/0132854 | A1 * | 6/2011 | Berdahl | G09F 3/201 211/59.2 |
| 2013/0284863 | A1 * | 10/2013 | Daniel | F16M 11/24 248/125.1 |
| 2015/0282616 | A1 * | 10/2015 | Weis | A47J 47/16 211/41.11 |
| 2016/0029852 | A1 * | 2/2016 | Ljung | A47J 47/16 211/41.11 |
| 2016/0351081 | A1 * | 12/2016 | Willoughby | A44C 5/0007 |
| 2018/0146827 | A1 * | 5/2018 | Clarke | A47B 55/02 |

\* cited by examiner

COOKWARE LID HOLDER

BACKGROUND

Modern day kitchens often include numerous pots and pans ("cookware") for cooking. Due to varied cooking needs, many kitchens include numerous size pots and pans. Such pots and pans are often paired with lids. The lids may be used to enhance cooking features, or to retain heat within the pots or pans.

In general, storage of cookware presents challenges, due to the size of cookware and their frequent use, as well as the variety in usage of different pieces of cookware. Lids present an even further challenge, since they are not easily stackable within one another, are not used as frequently as the pot or pan, and are not attached to their paired pot or pan.

As a result, cookware users are often presented with difficulties in determining where to store the lids in an efficient and useful manner. Even when the lid is placed on top of its paired pot or pan, this results in inefficiencies, preventing pots and pans from being stacked on top of one another.

It would be desirable, therefore, to provide a system and device for storing lids in an efficient manner. It would be further desirable to provide a lid holder that reduces the footprint of the lids within kitchen cabinets. It would be yet further desirable to provide a system for allowing such lids to reside without falling over within a storage area.

Therefore, system and devices incorporating such advantageous features are hereby provided.

SUMMARY

Disclosed is a system for storing one or more cookware lids. The system may include one or more holders or pockets, disposed in one or more tiers. The tiers may be disposed in a column from a top edge of the backing to a bottom edge of the backing. The holders may each be associated with a support sleeve. The system may be formed of a backing made of suitable material, such as cotton canvas. A pair of eyelets may be provided on the system, for hanging or mounting to an interior or exterior area.

DETAILED DESCRIPTION OF THE INVENTION

Disclosed herein are systems and devices for a cookware lid storage (the "system"). In an embodiment, the system provides a space-saving benefit. Further disclosed is a novel system and device that provides efficient and reduced footprint storage for lids in an organized manner.

Figure 1:
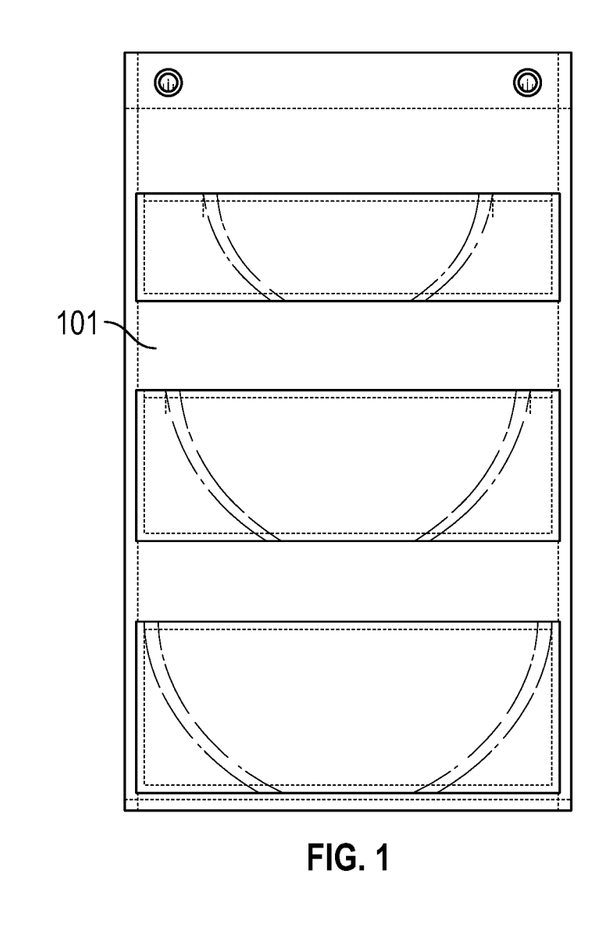
FIGS. 1-2 illustrate a front view of the lid storage system in accordance with an embodiment.

Referring now to FIG. 1, illustrated is a cookware lid holder system 101. In an embodiment, the lid holder 101 is specifically formed to hold one or more lids. The lids held may be in excess of ten pounds (10 lbs.), while maintaining structural integrity and avoiding collapse or folding over.

Lid holder 101 may include one or more holders or pockets, such as pockets 103, 105, and 107. Though the holder described herein illustrates three pockets, additional embodiments contemplate the use of one, two, four, five, six or any other suitable number of pockets.

Figure 2:
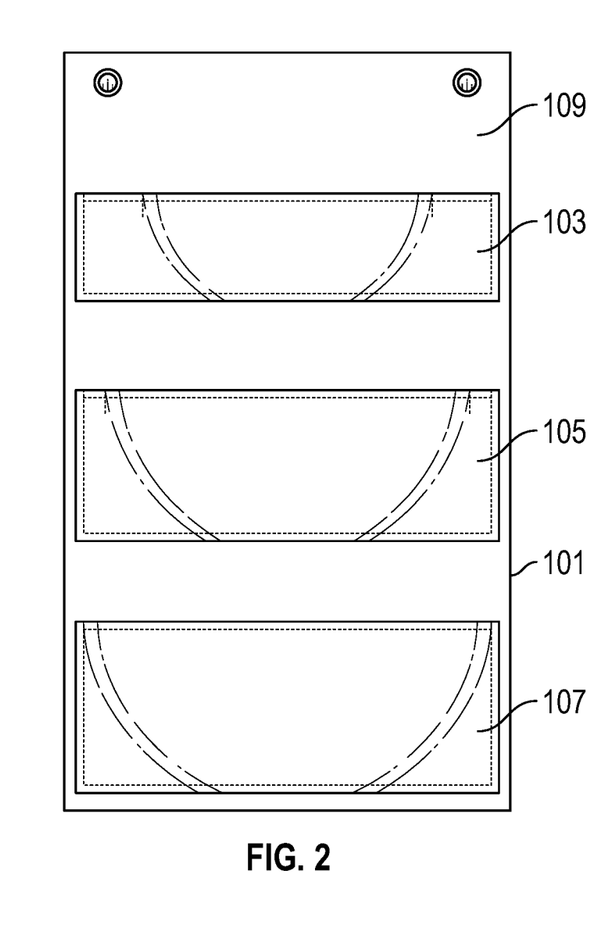

FIG. 2 illustrates an embodiment of the system 101 utilizing three pockets. Each of the pockets 103, 105, 107 may be fastened or joined to backbone 109. For example, the pockets may be affixed, glued, clipped, sewn or stitched onto backbone 109. Backbone 109 may include one or more rods 110, such as metal rods, vertically placed. The rods may provide rigidity and structure.

In one embodiment, the pockets are specifically sized such that each lid stored within the pocket is restrained, and does not tip out and over the pocket, or cause the lid holder to collapse. Moreover, the pockets are specifically sized so as not to be too large or small, such that they would prevent the lids from being easily removed from the pockets or fall out.

Figure 3A:
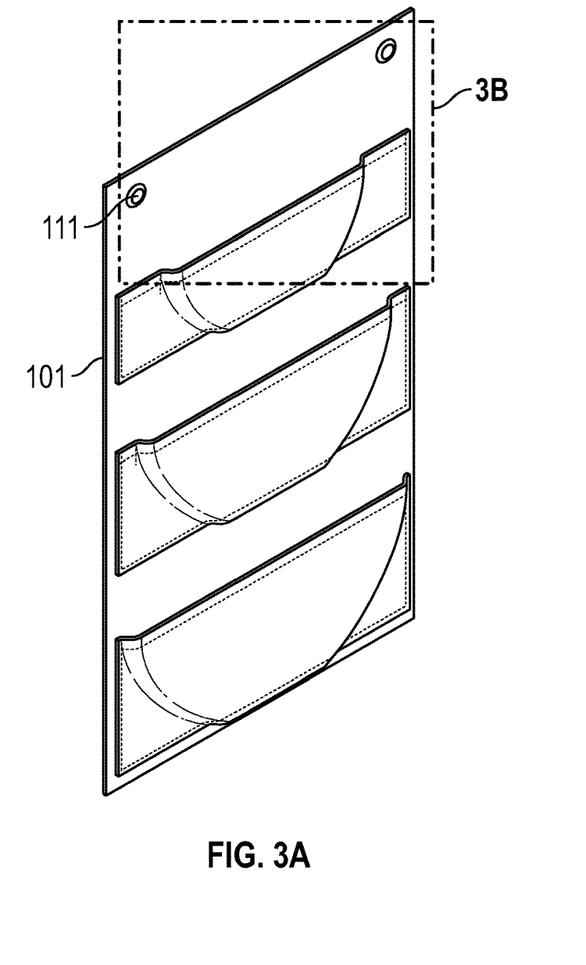
FIG. 3A illustrates a left-side front elevation of the lid storage system.
Figure 3B:
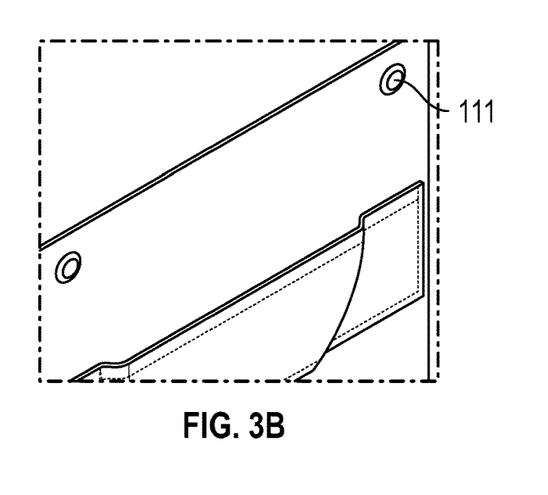
FIG. 3B illustrates a close-up view of a mounting system in accordance with an embodiment.
Figure 9A:
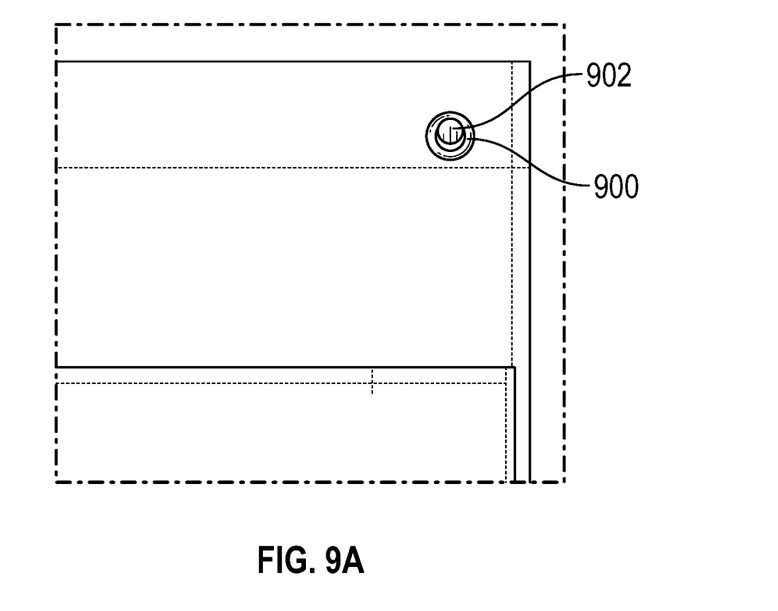
FIG. 9A illustrates an embodiment of the mounting system.

Referring now to FIG. 3A, illustrated is a mounting system 111 of holder 101. This is shown in greater detail in FIG. 3B. The mounting system 111 may be formed of one or more holes 111. The holes 111 may be formed to receive a corresponding piece, such as a hook (shown in FIG. 9). The hook may be mounted on a surface, such as an interior or exterior door of a cabinet, or a wall. The hook, when mounted within holes 111, may allow the system 101 to remain in an upright and vertical position. It should be noted that FIGS. 3A-3B illustrate two holes, spaced equally apart toward the edges of the holder 101. In other embodiments, any other suitable number of holes may be utilized, such as two side holes with a central hole, or one central hole. In yet additional embodiments, the mounting system may not include holes, and may instead utilize any suitable form of mounting, such as nails, screws, adhesive or magnets.

In accordance with an embodiment, the holder 101 is formed out of a proprietary material blend of fabric. For example, cotton fabric, such as cotton canvas fabric, may be used. The fabric may be weighted, such as 16 ounce cotton canvas fabric. In some embodiments, 16 ounce cotton canvas fabric is preferable, as it was discovered after extensive experimentation, and specifically formulated to retain the lids without collapsing the holder. For example, 8-10, or 16, gram cotton may only be used for lighter-weighted objects, and were found, along with cotton-linen blends to be too flimsy, causing the lid holder to collapse.

Figure 4:
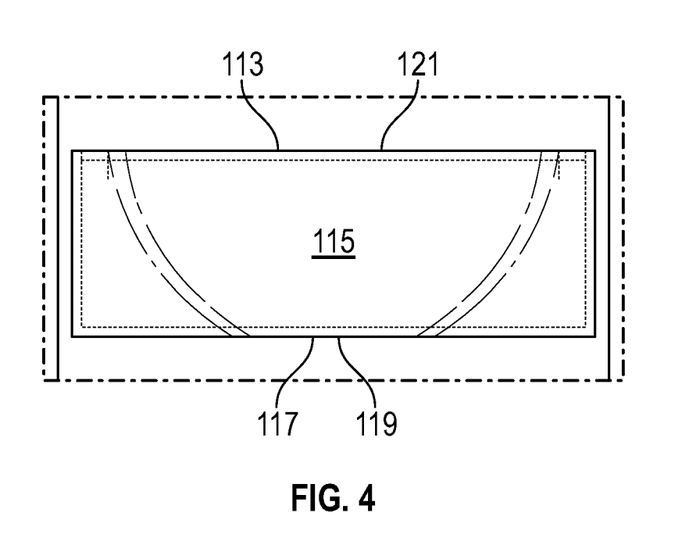
FIGS. 4-6 illustrate various views of one holder, in accordance with an embodiment.

In order to maintain shape and structure of the holder and to prevent collapse, each of the lid holder pockets include an opening 113. Referring now to FIG. 4, illustrated is a close-up view of a portion of FIG. 2, which is a zoomed-in view of a portion of a pocket in FIG. 2. As shown, the semi-circular shape of the pocket 115 terminates toward the bottom 117 of the pocket, and gives way to an opening 119.

At least a portion of the lid, when placed within the pocket, protrudes downward from the pocket.

Figure 5:
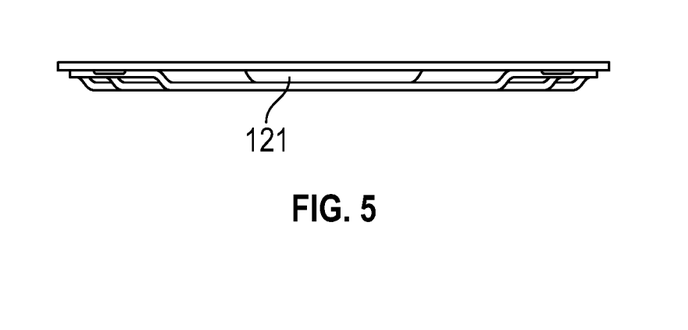
Figure 6:
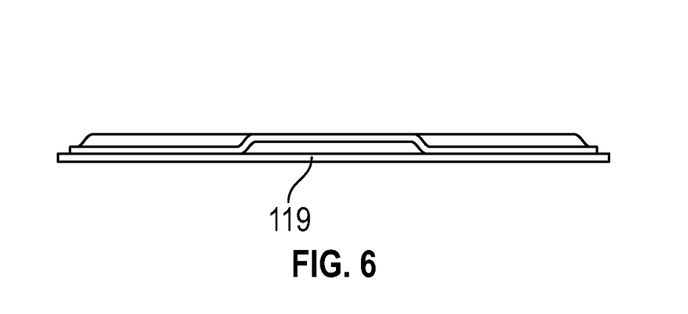

Referring to FIG. 5, illustrated is top-down view, showing the top 121 of the lid pocket. Shown in FIG. 6 is a bottom-up view, showing the bottom 117 of the lid pocket with an opening that is smaller than the opening of the top. The bottom opening of each pocket may be formed and sized to allow at least a portion of the lid residing therein to protrude out the hole. That is, the hole may be formed to allow a portion of the lid to protrude downward, but still provide an ample edge to support the lid. This allows the lid to protrude through and settle with gravity.

Figure 7:
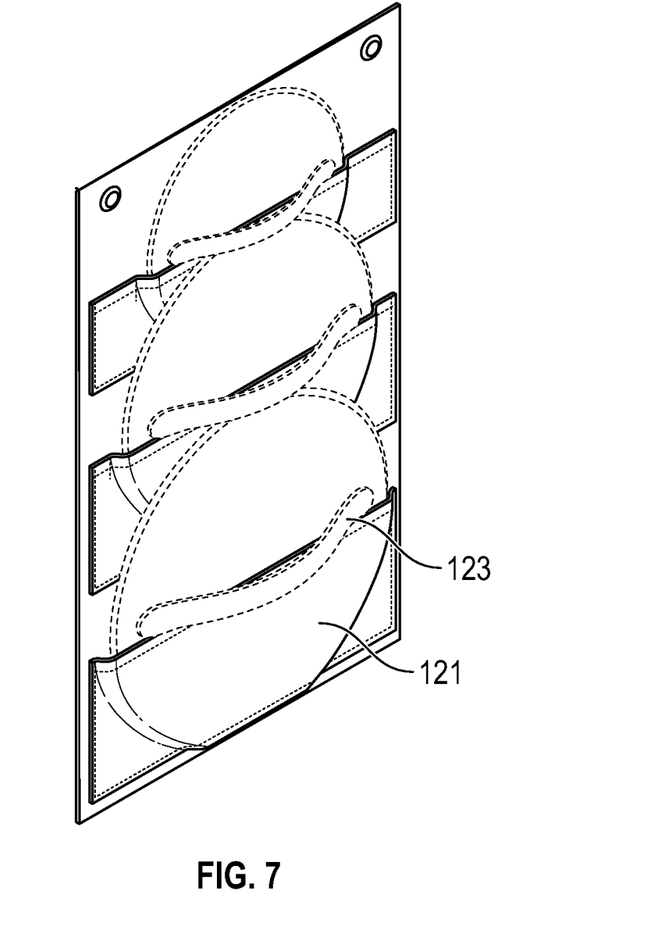
FIG. 7 illustrates a left-side front elevation view of the lid storage system with a plurality of lid holders stored therein.

In some embodiments, the lids may include a handle, such as handle 123. This is shown in FIG. 7. The pocket may therefore be specifically formed such that the top 121 supports handle 123. That is, despite the weight of the lid, the weighted canvas material allows the top 121 to remain in an upright and supportive position, thereby holding the lid up, and distributing some of the weight of lid. Accordingly, only a portion of the weight of the lid is being pulled through the pocket and through the downward hole 119 in bottom 117. Exemplary weights of various lids are shown below. It should be noted that such weights are exemplary, and any other suitable weight may be provided.

| Lid handle for 20 cm saucepan | 140 g |
|---|---|
| Lid handle for 26 cm Dutch oven | 184 g |
| Lid handle for 30 cm saute pan | 210 g |
| 20 cm saucepan lid + handle | 593 g |
| 26 cm Dutch oven lid + handle | 958 g |
| 30 cm saute pan lid + handle | 1212 g |

In one embodiment, a 40/60 blend of polypropylene and polyethylene may be added to the back canvas of the lid holder. In further embodiments, suitable blended variations may be used, including, but not limited to, 50/50 or 60/40. Further, the blend may be added to each pocket. Thus, in combination with overlapping lids and a second stitch, it provides added rigidity and maintains the shape and placement of the lids and/or lid holder.

In accordance with an embodiment, the top pocket may include a bottom opening of 13.5 cm, the middle pocket may include a bottom opening of 14 cm, and the bottom pocket may include a bottom opening of 15.2 cm. In certain embodiments, the openings of the various pockets may be adjusted for lids of different sizes. For example, the top pocket bottom opening may be approximately 13-14 cm, the middle pocket bottom opening may be approximately 14-15 cm, and the bottom opening of the bottom pocket may be approximately 14-15 cm.

Thus, in an embodiment, the pockets are specifically formed such that the lids overlap with one another. Therefore, the top of each lid borders the bottom of the handle on the lid residing above it. This allows for each lid to secure in place the lid above it, providing support to the lid of the handle above and distributing weight, while also maintaining neatness and proper placement.

Each pocket of the lid holder is formed with a specific depth, providing tightness to the pocket to retain the lids. Therefore, each pocket may be secured by an outer stitch around the entire outer border of the pocket. Additionally, to maintain the desired tightness, a second stitch, further inward from the edges of the pockets and the lid holder, may be added on both sides of the pocket. The length of the pocket between the two second-stitches may be equal to the diameter of the lid, providing a tight and retaining fit.

Figure 8A:
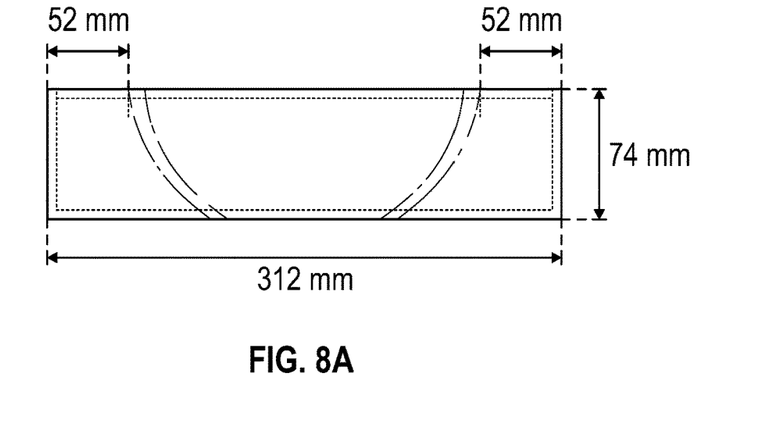
FIGS. 8A-8C illustrate various embodiments of the lid storage pockets.

Shown in FIG. 8A is an embodiment with the second, inner stitch highlighted with arrows. The second stitch may form an inner border around the lid within a pocket. This provides increased structural support around a lid, and secures the lid in place. In one embodiment, as shown, a smaller pocket may be used. For example, the pocket may be sized to 74 mm in height, with a second formed at 52 mm, or a suitable variation thereof, inward from the outer boundary of the pocket and outer stitching, on both sides of the pocket.

Figure 8B:
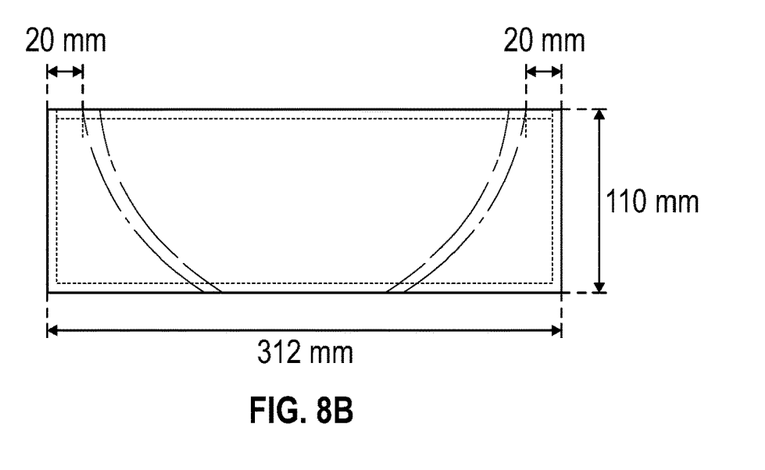
Figure 8C:
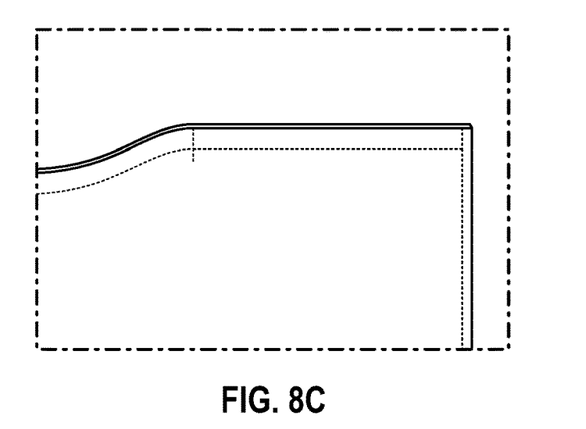

Referring now to FIG. 8B, in another embodiment, the second stitch may be formed at another distance. For example, the second stitch may be formed only 20 mm inward from the edge, due to the large size pocket (110 mm), which provides for a wider lid. FIG. 8C illustrates a close-up view of the second stitch.

In order to retain the lid holder 101 in an upright position, such as hanging over a cabinet door, the holder may include the mounting system/holes 111, such as those shown above in FIG. 3B. The holes may be retained in place by hooks, which are in turn attached to a door or surface by adhesive or other fasteners. However, due to the weight of the holder and lids, eyelets, such as stainless steel eyelets, or any other suitable form, may be added around the holes, in order to provide stability and strength. In one embodiment, the diameter of the holes may be formed to provide sufficient support while maintaining the holder in place. For example, the diameter of the holes may be 10 mm, or a suitable variation thereof. The one or more hooks attached to the holes may be formed of any suitable material, such as plastic, composite, wood, or stainless steel. In an embodiment, the hooks may be of 8 mm in length, or a suitable variation thereof.

It should be noted that due to the relatively small size of the eyelet, the shorter peg size on the hook, and smaller diameter of the hook provide sufficient support to maintain the hooks and fabric in place, with the lids. That is, the hooks are specifically formed of a shorter size and smaller diameter to provide a center of gravity that provides for sufficient support.

Therefore in an embodiment, the system may comprise an approximately 558 mm×323 mm lid holder, or similarly sized variation thereof, formed of 16 ounce cotton canvas fabric. The lid holder may include three pockets, for holding lids weighing a total of, for example, greater than six pounds, and in some instances, greater than ten pounds. The lid holder pockets may be attached (such as, by glue) to a back structure. Behind each pocket and in front of the back structure may be material of 40/60 polypropylene/polyethylene.

Figure 9B:
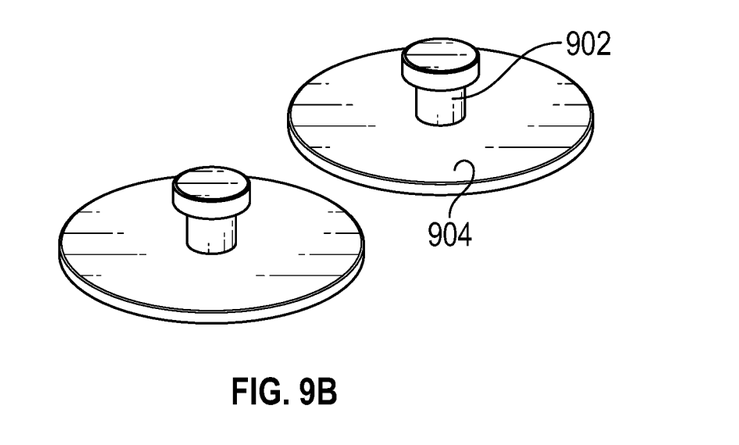
FIG. 9B illustrates hooks, as used in accordance with an embodiment.

Further, the system may include 10 mm diameter eyelets of stainless steel, formed to receive 9.5 mm steel hooks. The stainless steel eyelets 900 with the hooks 902 therein are shown in FIG. 9A, while FIG. 9B illustrates the hooks 902 themselves in greater detail, with a wider diameter circle 904 at the end, in order to ensure placement is maintained.

Figure 10:
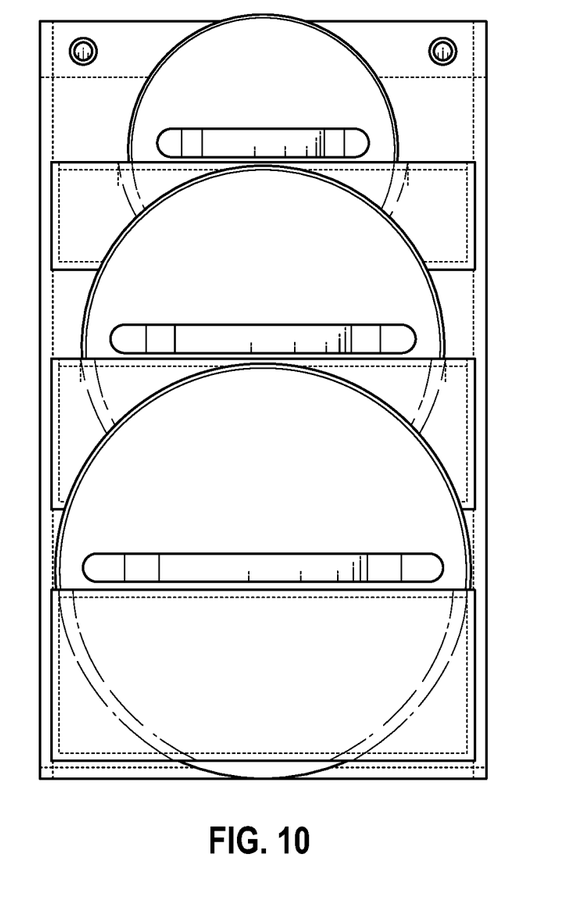
FIG. 10 illustrates a front view of the storage system with lids stored therein.

FIG. 10 illustrates an exemplary illustration of the entire system.

Figure 11:
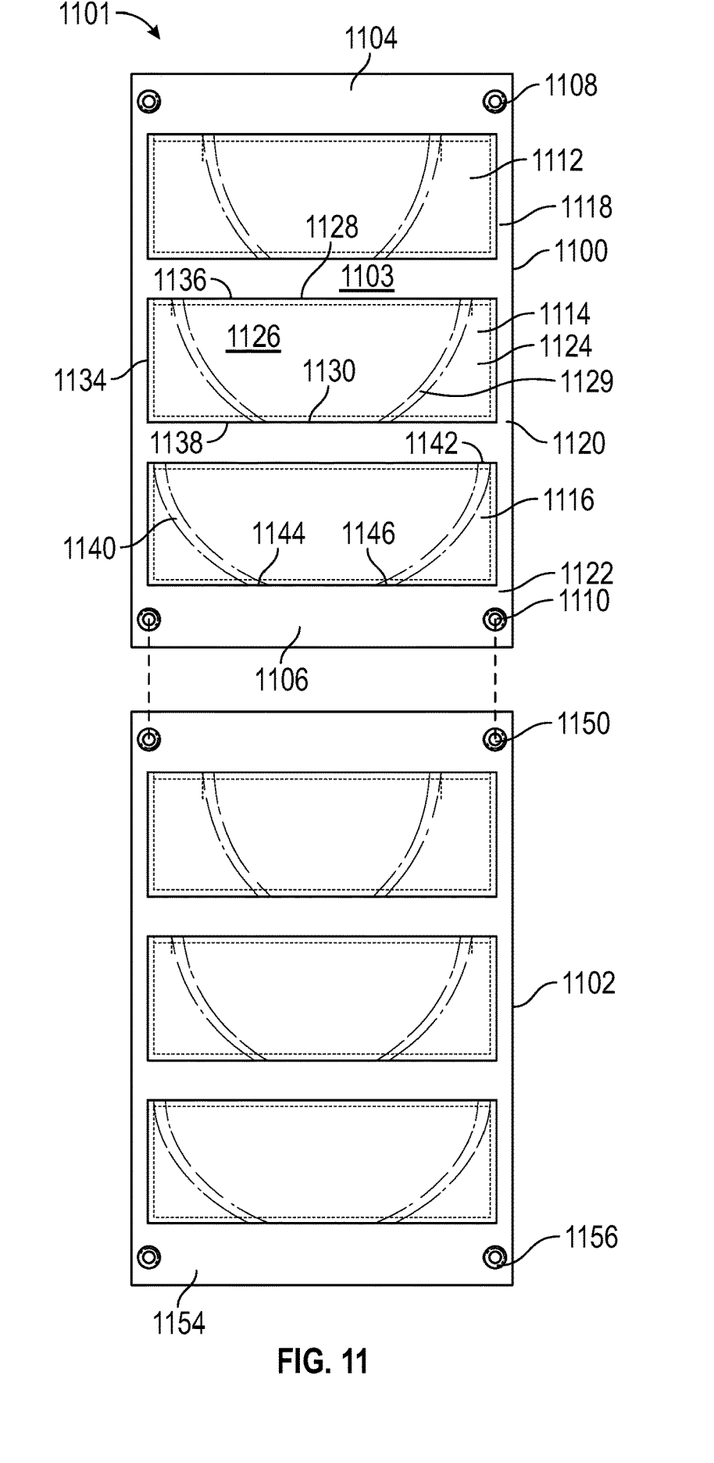
FIG. 11 illustrates an embodiment of a plurality of systems used in conjunction with one another.

FIG. 11 illustrates a system 1101. The features in system 1101 may be identical to system 101, and the features and components of system 1101 may function identically, with the exception of multiple lid holders. Thus, system 1101 may include multiple lid holders—first holder 1100 and second holder 1102. Either holder may include a backing 1103 and a set of three tiered pockets 1118, 1120, and 1122. The pockets may be disposed in a column from the top edge of the backing 1104 to the bottom edge 1106.

A support sleeve or opening 1112, 1114, 1116 may be disposed on each tier. The top edge may include a first add-on section, which may be configured to attach to a wall or hung on a door using eyelets 1108. Multiple holders may be attached in tandem by attaching the add-on sections of a top edge to the add-on section of the bottom edge of another.

The support sleeves or openings may each include a pair of attachment portions 1124 and an incomplete pocket portion 1126 disposed between the attachment portions. The incomplete pocket portion may not be attached to the backing at least along an entry edge 1128 and an exit edge 1130. The entry edge may include a length of unattachment running between terminal points 1140 1142; similarly, the exit edge also may include a length of unattachment running between terminals points 1144 1146. Circumferential edges 1129 may connect the terminal points of the entry edge to the terminal points of the exit edge.

The pair of attachment portions may be continuous with the incomplete pocket portion and each attach the support sleeves to the backing. Each attachment portion may include a first, second, and third attachment edge 1134, 1136, 1138, and each attachment edge has its own length of attachment, along which the attachment edge attaches to the backing. The first attachment edge may be perpendicular to the second and third attachment edges, which are parallel to each other. The length of attachment of the second attachment edge may be less than the length of attachment of the third attachment edge—this is because the entry edge, which is in line with the second attachment edge, must be larger than the exit edge, which is in line with the third attachment edge.

In accordance with an embodiment, a cookware lid holder system for holding cookware lids may therefore include a first holder, the first holder comprising a backing and a plurality of support sleeves. The backing may be formed of 16 ounce cotton canvas fabric and include a plurality of tiers. The tiers may be disposed in a column from a top edge of the backing to a bottom edge of the backing. The top edge may include a first add-on section. The first add-on section may include a pair of eyelets and be configured to hung on a wall or against a door.

Each of the plurality of support sleeves may disposed on one of the plurality of tiers, and include a pair of attachment portions and an incomplete pocket portion. The incomplete pocket portion may be disposed between the pair of attachment portions. The incomplete pocket portion may be unattached to the backing at least along an entry edge and an exit edge. The entry edge and the exit edge may include a pair of terminal points and lengths of unattachment, with the lengths of unattachment disposed between the terminal points.

The incomplete pocket portion may include a main body and pair of circumferential edges, with each of the pair of circumferential edges extending from the terminal points of the entry edge to the terminal points of the exit edge. The pair of attachment portions may each attach the support sleeves to the backing, and may be continuous with the incomplete pocket portion and with each other. The pair of attachment portions may each include a first, second, and third attachment edge, each edge including a length of attachment.

The first attachment edge may be perpendicular to the second and third attachment edges and the second and third attachment edges may be parallel to each other, with the length of attachment of the second attachment edge being less than the length of attachment of the third attachment edge. The length of attachment of the first attachment edge may be less than half the length of unattachment of the entry edge.

In certain embodiments, lids may have radii at least 90% of the lengths of unattachment of the entry edges. The entry edges may therefore be configured to receive between 25-50% of the cookware lids' diameters, and the exit edges are configured to receive between 2-20% of the cookware lids' diameter so that no more than 50% of the cookware lids are covered by the incomplete pocket portions.

The plurality of support sleeves may include a first, second and third support sleeve, with the lengths of unattachment of the entry edge and exit edge of the incomplete pocket portion of the first support sleeve being less, respectively, than the lengths of unattachment of the entry edge and exit edge of the incomplete pocket portion of the second support sleeve. The lengths of unattachment of the entry edge and exit edge of the incomplete pocket portion of the second support sleeve may be less, respectively, than the lengths of unattachment of the entry edge and exit edge of the incomplete pocket portion of the third support sleeve.

The entry edge of the system may be formed of a stiffer material than the main body and configured to support a pot lid protruding above the entry edge.

While this invention has been described in conjunction with the embodiments outlined above, many alternatives, modifications and variations will be apparent to those skilled in the art upon reading the foregoing disclosure. Accordingly, the embodiments of the invention, as set forth above, are intended to be illustrative, not limiting. Various changes may be made without departing from the spirit and scope of the invention.

What is claimed is:

1. A cookware lid holder system for holding cookware lids comprising: a first holder, the first holder comprising:
    a back panel and a plurality of support sleeves; wherein the back panel has a plurality of tiers, with the tiers being disposed in a column from a top edge of the back panel to a bottom edge of the back panel, with the top edge having a first add-on section, the first add-on section comprising a pair of eyelets and configured to receive steel hooks;
    wherein the back panel further includes a blend of polypropylene and polyethylene;
    each of the plurality of support sleeves disposed on one of the plurality of tiers, each sleeve comprising:
        a top, a bottom, a pocket portion at a midsection of the sleeve, a pair of opposing outer ends, a top opening formed at the top of the sleeve defining a top portion of the pocket portion and a bottom opening at the bottom of the sleeve defining a bottom portion of the pocket portion, wherein the opposing outer ends are attached to the back panel, wherein the top opening and the bottom opening are disposed between the pair of opposing outer ends, wherein the top opening spans a first length along the midsection of the sleeve between top terminal points, and the bottom opening spans a second length along the midsection of the sleeve between bottom terminal points, wherein the first length is larger than the second length, wherein the pocket portion is spaced apart from the back panel;
    wherein each sleeve within the plurality of support sleeves further includes a blend of polypropylene and polyethylene;

wherein the plurality of support sleeves comprises a first respective support sleeve, a second respective support sleeve, and a third respective support sleeve;
wherein the first respective support sleeve is smaller than the second respective support sleeve; and the second respective support sleeve is smaller than the third respective support sleeve;
wherein the first and second lengths of the top and bottom openings of the first respective support sleeve is less, respectively, than the first and second lengths of the top and bottom openings of the second respective support sleeve, and the first and second lengths of the top and bottom openings of the second respective support sleeve is less, respectively, than the first and second lengths of the top and bottom openings of the third respective support sleeve;
wherein the first respective support sleeve, the second respective support sleeve, and the third respective support sleeve are parallel to each other and vertically spaced apart from each other along the column,
wherein, when in use, the cookware lids are configured to be held within one or more main bodies of the pocket portions with the one or more main bodies receiving between 25-50% of the diameters of the cookware lids, and 2-20% of the diameters of the cookware lids extending through the bottom openings so that no more than 50% of each of the cookware lids are covered by the sleeves;
wherein the top of each sleeve is stiffer than the main body of each sleeve to support a respective cookware lid protruding above the top of each sleeve;
wherein, when in use, each cookware lid comprises a handle, and wherein the top of each of the plurality of sleeves is configured to support the handle of each cookware lid; and
wherein, when in use, a top of each respective cookware lid borders a bottom of the handle of the cookware lid residing above each respective cookware lid, the top of each respective cookware lid supporting the above cookware lid.

2. The cookware lid holder system of claim 1, further comprising a second holder that is substantially identical to the first holder, wherein the first holder comprises a second add-on section, the second add-on section is disposed adjacent to a bottom edge of the back panel of the first holder and is configured to receive a third add-on section of the second holder, the third add-on section of the second holder being disposed adjacent to a top edge of the second holder so that when the second holder attaches to the first holder the back panel of the first holder is approximately in line with a back panel of the second holder.

3. The cookware lid holder system of claim 1, wherein the back panel is made of 16 ounce cotton canvas fabric.

4. The cookware lid holder system of claim 1, wherein the back panel further includes at least one rod attached to a length extending from the top edge of the back panel to the bottom edge of the back panel.

5. The cookware lid holder system of claim 4, wherein the at least one rod is constructed from metal.

6. The cookware lid holder system of claim 1, wherein the blend comprises a mixture of 40% polypropylene, and 60% polyethylene.

7. The cookware lid holder system of claim 1, wherein the second length of the first respective support sleeve is a length of 13.5 cm,
the second length of the second respective support sleeve is a length of 14 cm, and
the second length of the third respective support sleeve is a length of 15.2 cm.

8. The cookware lid holder system of claim 1, wherein
a distance between the top terminal points and the outer ends of the first respective support sleeve are greater than a distance between the top terminal points and the outer ends of the second and third respective support sleeves respectively, and
the distance between the top terminal points and the outer ends of the second respective support sleeve are greater than the distance between the top terminal points and the outer ends of the third respective support sleeve.

9. A cookware lid holder system for holding cookware lids comprising: a first holder, the first holder comprising:
a back panel and a plurality of support sleeves; wherein the back panel has a plurality of tiers, with the tiers being disposed in a column from a top edge of the back panel to a bottom edge of the back panel, with the top edge having a first add-on section, the first add-on section comprising a pair of eyelets and configured to receive steel hooks, and wherein the back panel further includes at least one metal rod attached to a length extending from the top edge of the back panel to the bottom edge of the back panel;
wherein the back panel and plurality of support sleeves include a blend of 40% polypropylene and 60% polyethylene;
wherein the plurality of support sleeves includes a first respective support sleeve, a second respective support sleeve, and a third respective support sleeve, each sleeve disposed on one of the plurality of tiers, each sleeve comprising:
a top, a bottom, a pocket portion at a midsection of the sleeve, a pair of opposing outer ends, a top opening formed at the top of the sleeve defining a top portion of the pocket portion and a bottom opening at the bottom of the sleeve defining a bottom portion of the pocket portion, wherein the opposing outer ends are attached to the back panel, wherein the top opening and the bottom opening are disposed between the pair of opposing outer ends, wherein the top opening spans a first length along the midsection of the sleeve between top terminal points, and the bottom opening spans a second length along the midsection of the sleeve between bottom terminal points, wherein the first length is larger than the second length, wherein the pocket portion is spaced apart from the back panel;
wherein the first respective support sleeve is smaller than the second respective support sleeve; and the second respective support sleeve is smaller than the third respective support sleeve;
wherein the first respective support sleeve, the second respective support sleeve, and the third respective support sleeve are parallel to each other and vertically spaced apart from each other along the column;
wherein the second length of the first respective support sleeve is 13.5 cm, the second length of the second respective support sleeve is 14 cm, and the second length of the third respective support sleeve is 15.2 cm;
wherein, when in use, the cookware lids are configured to be held within one or more main bodies of the pocket portions with the one or more main bodies receiving between 25-50% of the diameters of the cookware lids, and 2-20% of the diameters of the cookware lids extending through the bottom openings so that no more than 50% of each of the cookware lids are covered by the sleeves;

the top of each sleeve is stiffer than the main body of each sleeve to support a respective cookware lid protruding above the top of each sleeve;

wherein, when in use, each cookware lid comprises a handle, and wherein the top of each of the plurality of sleeves is configured to support the handle of each cookware lid; and wherein, when in use, a top of each respective cookware lid borders a bottom of the handle of the cookware lid residing above each respective cookware lid, the top of each respective cookware lid supporting the above cookware lid.

* * * * *